United States Patent
Irsigler et al.

(10) Patent No.: US 8,515,642 B2
(45) Date of Patent: Aug. 20, 2013

(54) CONTROL OF AN ACTUATOR OF A BRAKE OF A MOTOR VEHICLE

(75) Inventors: Michael Irsigler, Regensburg (DE); Jens Niemann, Lippstadt (DE)

(73) Assignee: Continental Automotive GmbH, Hannover (DE)

( * ) Notice: Subject to any disclaimer, the term of this patent is extended or adjusted under 35 U.S.C. 154(b) by 626 days.

(21) Appl. No.: 12/667,546

(22) PCT Filed: Jun. 30, 2008

(86) PCT No.: PCT/EP2008/058397
§ 371 (c)(1),
(2), (4) Date: May 21, 2010

(87) PCT Pub. No.: WO2009/003987
PCT Pub. Date: Jan. 8, 2009

(65) Prior Publication Data
US 2010/0256886 A1    Oct. 7, 2010

(30) Foreign Application Priority Data
Jul. 2, 2007   (DE) .................. 10 2007 030 627

(51) Int. Cl.
*G06F 19/00* (2011.01)
*B62L 1/06* (2006.01)

(52) U.S. Cl.
USPC ........................................ 701/70; 188/24.16

(58) Field of Classification Search
USPC .................... 701/70, 83, 78; 303/13, 14, 16, 303/17, 20, 22.2; 188/24.15, 24.16, 24.21, 188/24.22, 1.11 L, 1.11 E, 73.33–73.46, 79.56
See application file for complete search history.

(56) References Cited

U.S. PATENT DOCUMENTS

| 5,208,484 | A | 5/1993 | Okano et al. .................. 307/10.1 |
| 5,372,411 | A | 12/1994 | Gerstenmaier et al. ........ 303/100 |
| 6,256,570 | B1 | 7/2001 | Weiberle et al. ................. 701/70 |
| 7,154,278 | B2 | 12/2006 | Scholl et al. ................... 324/522 |
| 7,673,949 | B2 | 3/2010 | Kuramochi et al. ..... 303/122.03 |
| 7,896,446 | B2 * | 3/2011 | Yamamoto ....................... 303/20 |
| 2004/0158781 | A1 | 8/2004 | Pihet ............................ 714/712 |
| 2007/0192030 | A1 * | 8/2007 | Tanimichi et al. ............ 701/301 |

FOREIGN PATENT DOCUMENTS

| DE | 19861144 A1 | 5/2000 |
| DE | 19903265 A1 | 8/2000 |
| DE | 10057486 | 4/2001 |
| DE | 10061054 A1 | 7/2002 |

(Continued)

OTHER PUBLICATIONS

Japan Office Action, Japanese Patent Application No. 2010-513959, 18 pages, Mar. 21, 2012.

(Continued)

*Primary Examiner* — Muhammad Shafi
(74) *Attorney, Agent, or Firm* — King & Spalding L.L.P.

(57) ABSTRACT

An arrangement for controlling the activity of an actuator (AK) of a brake of a motor vehicle has a first path for a first signal (TRIG1) relating to the activity of the actuator (AK), a second path for a second signal (TRIG2) relating to the activity of the actuator (AK), and a circuit (MOSFET, TRANS, RES3, BAT2) enabling the actuator (AK) to be activated in such a manner that the actuator (AK) is activated if a determined modification of the first signal (TRIG1) and also a determined modification of the second signal (TRIG2) is present. The determined modification of the first signal (TRIG1) is in the opposite to the determined modification of the second signal (TRIG2).

19 Claims, 3 Drawing Sheets

(56) References Cited

FOREIGN PATENT DOCUMENTS

| | | | |
|---|---|---|---|
| DE | 10349600 | | 5/2004 |
| DE | 10333966 | A1 | 2/2005 |
| DE | 10353056 | A1 | 6/2005 |
| EP | 1457399 | * | 9/2004 |
| EP | 1574869 | | 9/2005 |
| EP | 1686029 | A1 | 8/2006 |
| JP | 54090732 | A | 7/1979 |
| JP | 6144153 | A | 5/1994 |
| JP | 11113288 | A | 4/1999 |
| JP | 3253440 | B2 | 2/2002 |
| JP | 2004/111178 | | 4/2004 |
| JP | 2005/014065 | | 1/2005 |
| JP | 2006/264369 | | 10/2006 |
| JP | 2007/008359 | | 1/2007 |
| WO | 0135432 | | 5/2001 |
| WO | WO-0135432 | * | 5/2001 |
| WO | 2006/100878 | A1 | 9/2006 |

OTHER PUBLICATIONS

International Search Report and Written Opinion for Application No. PCT/EP2008/058397 (12 pages), Oct. 31, 2008.

* cited by examiner

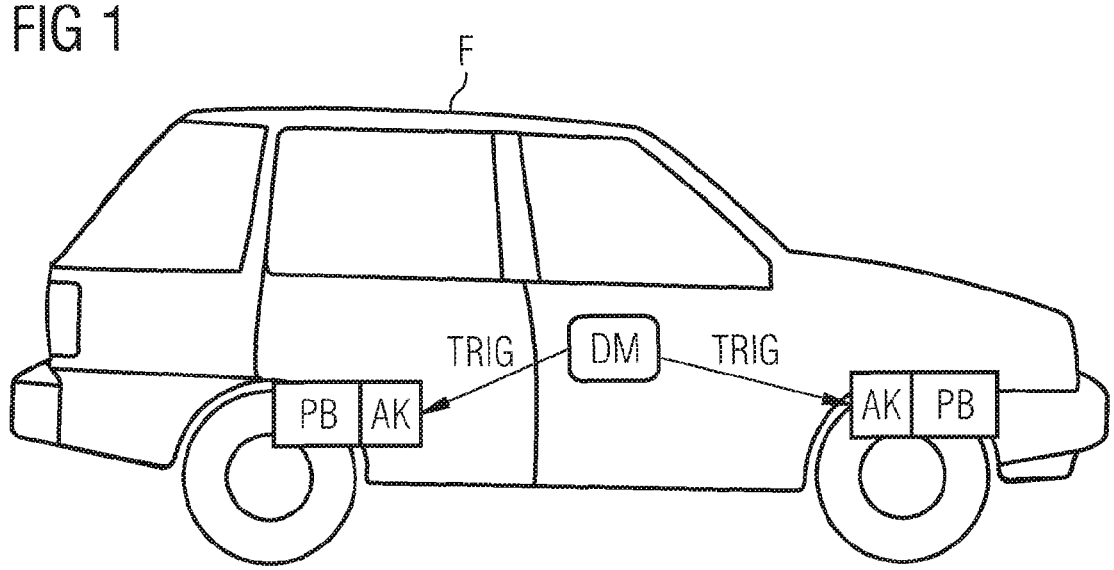
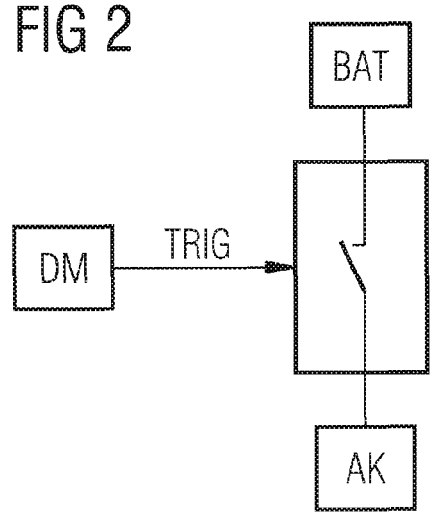

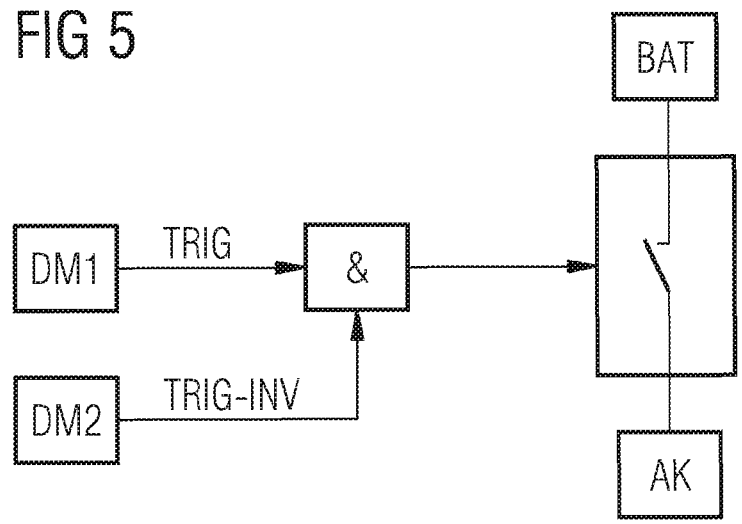
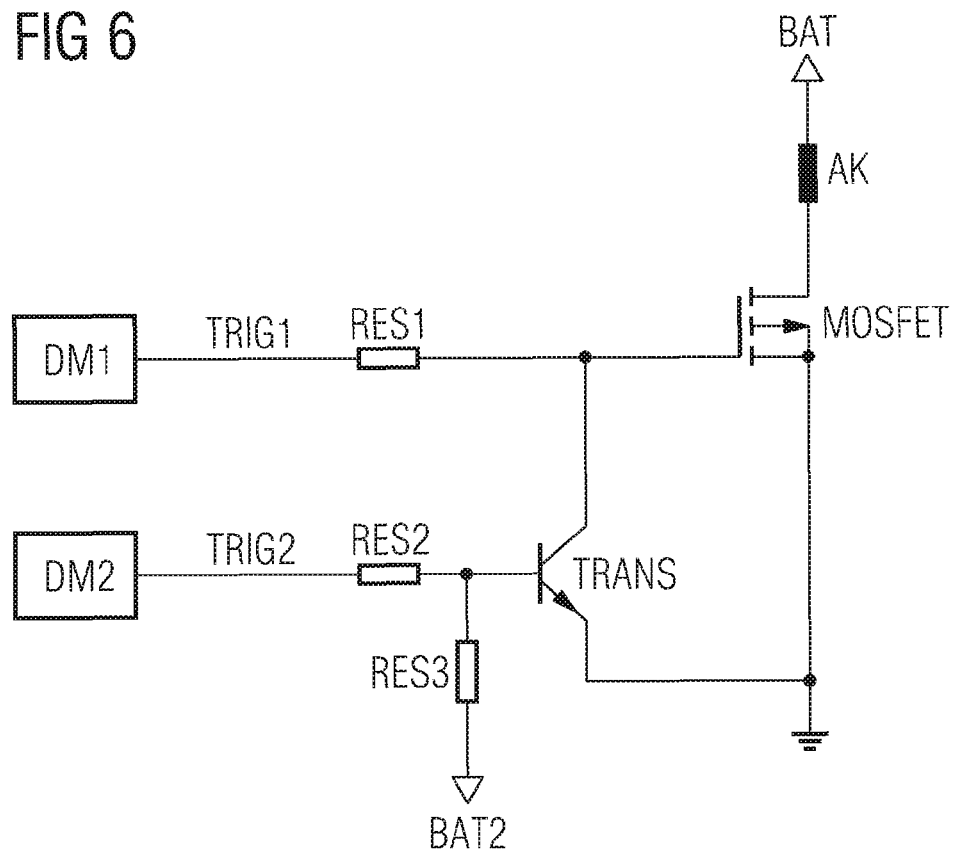

US 8,515,642 B2

CONTROL OF AN ACTUATOR OF A BRAKE OF A MOTOR VEHICLE

CROSS-REFERENCE TO RELATED APPLICATIONS

This application is a U.S. National Stage Application of International Application No. PCT/EP2008/058397 filed Jun. 30, 2008, which designates the United States of America, and claims priority to German Application No. 10 2007 030 627.1 filed Jul. 2, 2007, the contents of which are hereby incorporated by reference in their entirety.

TECHNICAL FIELD

The invention relates to an arrangement for controlling the activation of an actuator of a brake of a motor vehicle.

BACKGROUND

Conventional parking brakes or more precisely parking brake systems, such as disk, drum or drum-in-hat brake systems, are well known from the prior art. In these cases, by means of a brake lever provided in the vehicle, an actuating force is manually produced which is transmitted to the parking brake via a system of control cables. Depending on the actuating force applied to the parking brake, there is produced by the parking brake a brake force which is transmitted to the brake mechanism unit of the parking brake. The brake force produced is therefore proportional to the actuating force transmitted by the cable system. When a predefined actuating force is applied, a predefined braking force is directly applied to the brake mechanism unit.

Conventional, purely mechanically controlled parking brakes are being increasingly replaced by electronically controlled parking brakes or more precisely parking brake systems in which the generation of the actuating force required for actuating the brake mechanism is controlled via an electronic control system. The parking brake is applied or released by an actuator depending on the presence of an electronic actuating signal. To generate a mechanical actuating force acting on the brake mechanism, an electric motor gear unit, for example, is provided which is connected, for example, to the brake mechanism via a control cable system and can be controlled via the control system. The electronic actuating signal for actuating the electronic parking brake is here generated, for example, by an electronic control provided in the vehicle, in particular pushbutton, rocker or switch module. Alternatively, the electronic parking brake can be controlled via an actuating signal generated by a control routine.

Motor vehicle parking brakes electronically or motor operated by means of an actuator have significant advantages over hitherto usual solutions in which the parking brake was cable-operated via a lever on the motor vehicle's transmission tunnel. Compared to a purely mechanical solution, they have the advantage that no handbrake lever is required on the center console, that no long control cables need to be installed which involve design complexity and corresponding maintenance. In addition, with the electronic parking brake, the space that would otherwise be required for the handbrake lever is available for other purposes. Electronically operated parking brakes also have the advantage that they have the same effect on the brake irrespective of the force exerted by the operator.

In the case of electronic parking brakes as well as other electronic brakes, particular attention must be paid to ensuring that the brake is not applied unintentionally while traveling.

SUMMARY

According to various embodiments, an efficient arrangement for controlling the activation of an actuator of a motor vehicle brake can be disclosed.

According to an embodiment, an arrangement for controlling the activation of an actuator of a brake of a motor vehicle may comprise a first path for a first signal relating to the activation of the actuator, a second path for a second signal relating to the activation of the actuator, a circuit for enabling the actuator to be activated such that the actuator is activated if a particular change in the first signal and, in addition, a particular change in the second signal is present, the particular change in the first signal being in the opposite direction to the particular change in the second signal.

According to a further embodiment, the particular change in the first signal and the particular change in the second signal may be each a voltage change of mutually opposite sign. According to a further embodiment, the particular change in the first signal and the particular change in the second signal may be each a current change of mutually opposite sign. According to a further embodiment, the particular change in the first signal may correspond to a change from a first to a second value and the particular change in the second signal may correspond to a change from the second to the first value. According to a further embodiment, the circuit may comprise a first transistor and a second transistor, the second transistor connecting the second path to the first transistor. According to a further embodiment, the second transistor may be connected such that it is rendered conducting if the particular change in the second signal is present. According to a further embodiment, the first transistor can be connected such that it is rendered conducting if the particular change in the first signal is present and, in addition, the second transistor is conducting. According to a further embodiment, the circuit may enable the actuator to be activated by a connection being established between an electrical energy source and the actuator. According to a further embodiment, the first path can be disposed close to the second path so that a common-mode fault causes a same-direction change in the first signal and the second signal. According to a further embodiment, the activation of the actuator may cause the brake to be applied. According to a further embodiment, the arrangement may have a first evaluation unit for outputting the first signal and a second evaluation unit for outputting the second signal.

According to another embodiment, a vehicle may have a brake and an arrangement as described above.

BRIEF DESCRIPTION OF THE DRAWINGS

The invention will now be explained in greater detail with reference to an exemplary embodiment and the accompanying drawings in which:

FIG. 1: shows a motor vehicle,
FIG. 2: schematically illustrates a circuit for controlling an actuator,
FIG. 5: shows an improved circuit compared to FIG. 4 having two parallel paths,
FIG. 6: shows a circuit diagram for FIG. 5.

DETAILED DESCRIPTION

Figure 3:
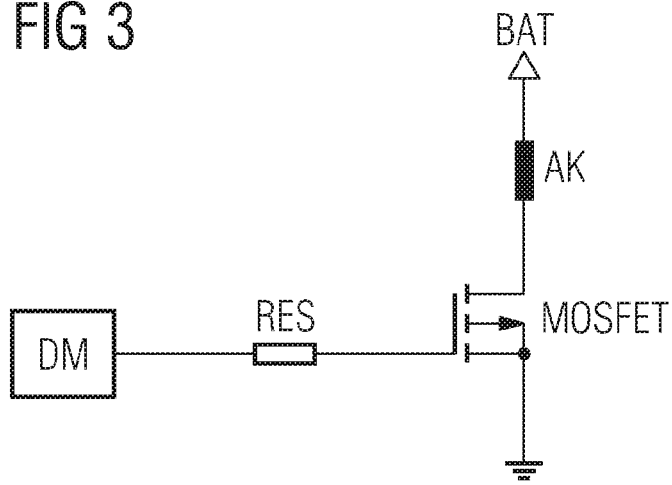
FIG. 3: shows a circuit diagram for FIG. 2,
FIG. 4: shows a circuit with two parallel paths.

The arrangement for controlling the activation of an actuator of a brake of a motor vehicle according to various embodiments comprises a first path for a first signal relating to the activation of the actuator, a second path for a second signal relating to the activation of the actuator, and a circuit for enabling the actuator to be activated such that the actuator is activated if a particular change in the first signal and, in addition, a particular change in the second signal is present, the particular change in the first signal being in the opposite direction to the particular change in the second signal.

The brake in question is a motor vehicle brake that can be operated using an actuator, in particular an electric motor, such as, for example, an electronic parking brake or a self-energizing electric brake. If the actuator is activated, it acts on the brake by mechanical work or more specifically movement. Depending on the design of the brake, the brake can be applied and/or released by activation of the actuator.

In order to cause the actuator to be activated, signals are transmitted over a first and over a second path. These paths, e.g. electrical conductors possibly with electrical components, or light guides or radio links, constitute signal transmission routes. The signals can be of different kinds; they are used to convey information. The first and the second path, i.e. at least two separate paths, are therefore provided for transmitting information relating to the activation of the actuator, so that at least two mutually independent signals or one signal on two routes can be transmitted. Using a plurality of paths increases reliability and reduces the probability of the actuator being activated erroneously.

The circuit is used to check a condition in respect of the first and second signal. Activation of the actuator shall be enabled by the circuit only if the condition is fulfilled. The condition is that a particular change is present for the first and the second signal. A particular change can be a particular individual value, or also a plurality of possible values. The particular changes are in counter-relationship to one another, i.e. they go in opposite directions. For example, a change in the first signal from A to B runs counter to a change in the second signal from B to A. In particular, the counter-relationship is present if the particular change in the first signal is of opposite sign to that of the particular change in the second signal. The change in the first signal does not run counter to the change in the second signal, for example, if these changes are caused by a common-mode disturbance; the latter produces a change in the first signal going in the same direction as the change it causes in the second signal. According to a further embodiment, the particular change in the first signal and the particular change in the second signal is in each case a voltage change or a current change of opposite sign. It is possible here for the absolute value of the particular change in the first signal to be equal to the absolute value of the particular change in the second signal, or for said absolute values to be different from one another.

It is possible that the particular change in the first signal corresponds to a change from a first to a second value and the particular change in the second signal to a change from the second to the first value.

According to a further embodiment, the circuit comprises a first transistor and a second transistor, the second transistor connecting the second path to the first transistor. One possibility is for the first path to lead directly into the first transistor. The second transistor can be connected such that it is rendered conducting if the particular change in the second signal is present. This means that the second transistor is in the nonconducting state as long as the particular change is not present in the second path. The presence of the particular change in the second signal is preferably the only condition for the second transistor to be rendered conducting. The first transistor can be connected such that it is rendered conducting if the particular change in the first signal is present and, in addition, the second transistor is conducting. This means that the second transistor is nonconducting as long as said two conditions do not both apply. The presence of, on the one hand, the particular change in the first signal and, on the other, the conducting state of the second transistor are preferably the only conditions for the second transistor being rendered conducting.

According to a further embodiment, the circuit enables the actuator to be activated by a connection being established between an electrical energy source, e.g. the vehicle battery or another battery, and the actuator.

It is advantageous if the first path is disposed in proximity to the second path so that a common-mode disturbance causes a same-direction change in the first and second signal. The same change in the first and second signal here means a same-direction change of equal magnitude.

The activation of the actuator can cause the brake to be applied. It is also possible for activation of the actuator to additionally or alternatively result in the brake being released.

The arrangement can have a first evaluation unit for outputting the first signal and a second evaluation unit for outputting the second signal, these being separate units which output the first and the second signal independently of one another. The evaluation units can decide e.g. on the basis of particular algorithms and/or input signals that activation of the actuator is to take place or be terminated, and outputs the first or second signal accordingly. Alternatively to using two separate evaluation units, these can be present in the form of a single unit which outputs, on the one hand, the first and, on the other, the second signal.

FIG. 1 schematically illustrates a motor vehicle F with an evaluation device DM. The vehicle also has an electronic parking brake system PB. A separate parking brake PB can be provided for each wheel of the motor vehicle F, or also a single parking brake PB can be provided for the motor vehicle F. In FIG. 1, two parking brakes PB are shown by way of example. The evaluation device DM decides whether the parking brake PB is to be applied or released. If such a decision has been made, the evaluation device DM instructs actuators AK responsible for actuating the parking brake PB to apply or release the parking brake PB by means of the output signal TRIG. The decision to apply or release the parking brake PB is taken by the evaluation device DM in conjunction with information originating e.g. from a driver actuatable control assigned to the parking brake PB. In this way the driver can apply or release the electronic parking brake PB e.g. by pressing a button.

FIG. 2 schematically illustrates a circuit for controlling the actuator AK of the parking brake PB. The output signal TRIG which is output by the evaluation device DM acts on a switch. Closure of the switch causes a connection to be established between a battery BAT and the actuator AK. The battery BAT supplies current to the actuator AK so that the latter is activated and applies the parking brake. FIG. 3 shows a circuit diagram corresponding to FIG. 2. The evaluation device DM is connected to a field effect transistor MOSFET via a resistor RES. The output signal TRIG corresponds to a particular voltage level output by the evaluation device DM. The field effect transistor MOSFET is a nonconducting state contingent upon the voltage set by the evaluation device DM. The normal state of the field effect transistor MOSFET is nonconducting. If the nonconducting state of the field effect transistor MOSFET is ended by a particular voltage being set, it is possible for current to flow from the battery BAT through the actuator AK so that the latter is activated and applies the parking brake.

It will now be assumed that the evaluation device DM can set two voltage levels: a low voltage level, hereinafter denoted by LOW, e.g. 0 volts, and a higher voltage level, hereinafter denoted by HIGH, e.g. 5 volts. In the normal state, the evaluation device DM outputs the voltage LOW so that the field effect transistor MOSFET is nonconducting and the actuator AK is not activated. The nonconducting state of the field effect transistor MOSFET is ended by the output signal TRIG of the evaluation device DM changing from LOW to HIGH.

In the case of safety-relevant functions such as e.g. the electronic parking brake or an airbag, these must be prevented from being activated unintentionally, i.e. without a corresponding decision on the part of the evaluation device DM. If the parking brake were to be applied e.g. while the vehicle is traveling, this could result in a serious accident. It is therefore attempted to design the circuit controlling the application of the parking brake so as to eliminate unwanted triggering as far as possible.

Figure 4:
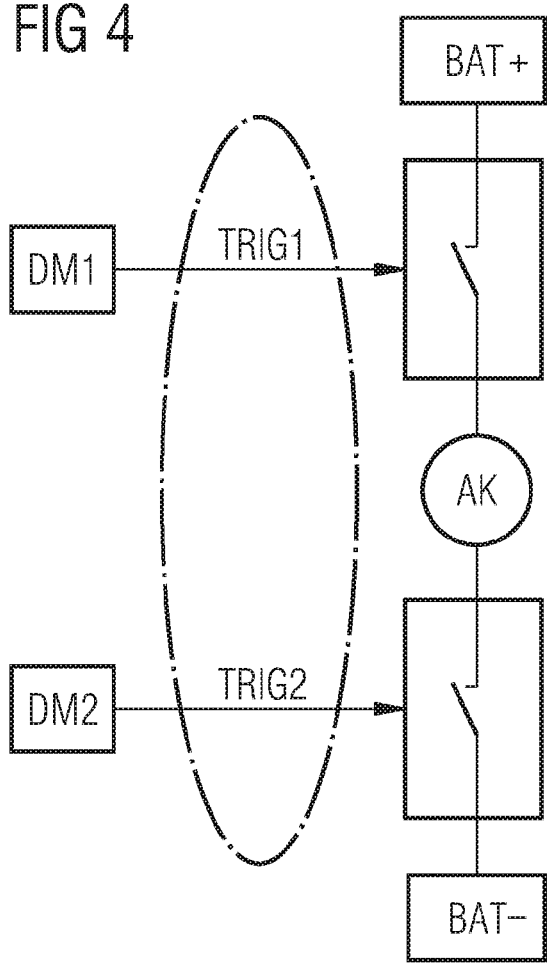

One possibility for reducing the probability of unwanted triggering is to use two paths, as shown e.g. in FIG. 4. The evaluation device DM is subdivided into two evaluation devices DM1 and DM2. The evaluation device DM1 outputs the output signal TRIG1, the evaluation device DM2 outputs the output signal TRIG2. The output signals TRIG1 and TRIG2 act on a switch in the manner explained in connection with FIGS. 2 and 3, i.e. a change from LOW to HIGH of the evaluation device DM1 causes the switch assigned to the evaluation device DM1 to be closed, and a change from LOW to HIGH of the evaluation device DM2 causes the switch assigned to the evaluation device DM2 to be closed. Closure of the switch assigned to the evaluation device DM1 causes the actuator AK to be connected to the positive terminal BAT+ of the battery, and closure of the switch assigned to the evaluation device DM2 causes the actuator AK to be connected to the negative terminal BAT− of the battery.

Thus, as shown in FIG. 4, the actuator AK is supplied with current by the battery and the parking brake applied accordingly if both evaluation devices DM1 and DM2 perform a same-direction change, namely the same change from LOW to HIGH. This corresponds to a plausibility check of the output signals of the evaluation devices DM1 and DM2: if a malfunction, i.e. an unintended signal causing the respective switch to close, occurs within one path, the parking brake is not applied, as the same change, i.e. the change from LOW to HIGH voltage, must be present in both paths for the parking brake to be applied. An individual fault is therefore prevented by the circuit in FIG. 4.

However, it is possible that both paths in FIG. 4 are affected by the same fault/disturbance, i.e. a common-mode fault is present. An example of this is the ingress of water or some other conductive substance into the housing containing the circuit in FIG. 4, or coupling-in of external electric or magnetic fields. The common fault has the same effect in both paths, i.e. the same voltage would occur in both paths. This identical effect is indicated in FIG. 4 by the oval around the two output signals TRIG1 and TRIG2. If this identical voltage corresponds to the value HIGH, this would result in closure of the two switches and therefore application of the parking brake.

This problem of the common fault in both paths is prevented by a circuit as shown in FIG. 5. The evaluation device DM1 here produces the output signal TRIG, and the evaluation device DM2 produces the output signal TRIG-INV. The switch is closed if the output signal TRIG-INV is the inverse of the output signal TRIG. This means that a change of the evaluation device DM1 from LOW to HIGH and, in addition, a change of the evaluation device DM2 from HIGH to LOW, corresponding to an ANDing and indicated the symbol &, is necessary for closure of the switch. Alternatively, it is possible for the opposite constellation to be implemented, i.e. a change of the evaluation device DM1 from HIGH to LOW and, in addition, a change of the evaluation device DM2 from LOW to HIGH.

FIG. 6 shows a circuit diagram corresponding to FIG. 5. The evaluation device DM1 is connected to the field effect transistor MOSFET via the resistor RES1. If the actuator is not to be activated, the evaluation device DM1 outputs LOW voltage. In order to render the field effect transistor MOSFET conducting, the evaluation device DM1 must change its output signal and therefore output HIGH voltage. The evaluation device DM2 is connected to the field effect transistor MOSFET via the resistor RES2 and a bipolar transistor TRANS. A battery BAT2 at voltage level HIGH and another resistor RES3 are also present. If the actuator is not to be activated, the evaluation device DM2 outputs HIGH voltage. The bipolar transistor TRANS is nonconducting unless the evaluation device DM2 outputs LOW voltage. The field effect transistor MOSFET is rendered conducting if the evaluation device DM1 outputs HIGH voltage and the bipolar transistor TRANS is conducting, i.e. the evaluation device DM2 outputs LOW voltage. This causes the actuator AK to be supplied with current from the battery BAT and activated accordingly so that the parking brake is applied.

In order to activate the actuator AK in the circuit in FIG. 6, a change in the output signal of the evaluation device DM1 from LOW to HIGH and, in addition, a change in the output signal of the evaluation device DM2 from HIGH to LOW is required. If a common malfunction i.e. a common-mode fault occurs in both paths in FIG. 6, this has the same effect in both paths as explained above with reference to FIG. 4, i.e. the same voltage occurs in both paths. However, as an opposite-direction change in the voltage of the two paths would be necessary for the field effect transistor MOSFET to be rendered conducting, the common fault cannot result in unintended triggering of the parking brake.

In order to provide the explained protection against common faults, it is advantageous if the two paths run close together. This ensures that they are affected by the same malfunction and this malfunction accordingly cannot cause the actuator AK to be activated unintentionally.

The invention has been described above with reference to an exemplary embodiment. Self-evidently, numerous changes and modifications are possible without departing from the scope of the invention. In particular, the invention is not limited to being used for an electronic parking brake; it can also be used, for example, for controlling an actuator for a service i.e. foot brake of a motor vehicle.

What is claimed is:

1. An arrangement for controlling an actuator of a brake or a motor vehicle, comprising:
   a first path for a first signal relating to an activation of the actuator,
   a second path for a second signal relating to the activation of the actuator, and
   a circuit for:
      enabling the actuator to be activated in response to identifying both (a) a particular increase in a first parameter of the first signal and (b) a particular decrease in a second parameter of the second signal, and not enabling the actuator to be activated in response to each of (a) a decrease in both the first and second parameters, (b) an increase in both the first and second parameters, and (c) an unchanged status in at least one of the first and second parameters, wherein the first and second path are configured such that a particular common-mode fault occurring in both the first and second paths causes the first value of the first signal and the second value of the second signal to both increase or both decrease, such that the actuator is not activated by the circuit.

2. The arrangement according to claim 1, wherein the particular increase of the first parameter of the first signal and the particular decrease of the second parameter of the second signal each define a respective voltage change.

3. The arrangement according to claim 1, wherein the particular increase of the first parameter of the first signal and the particular decrease of the second parameter of the second signal each define a respective current change.

4. The arrangement according to claim 1, wherein the particular increase of the first parameter of the first signal corresponds to a change from a first to a second value and the particular decrease of the second parameter of the second signal corresponds to a change from the second to the first value.

5. The arrangement according to claim 1, wherein the circuit comprises a first transistor and a second transistor, the second transistor connecting the second path to the first transistor.

6. The arrangement according to claim 5, wherein the second transistor is connected such that it is rendered conducting if the particular decrease of the second parameter of the second signal is present.

7. The arrangement according to claim 6, wherein the first transistor is connected such that it is rendered conducting if the particular increase of the first parameter of the first signal is present and, in addition, the second transistor is conducting.

8. The arrangement according to claim 1, wherein the circuit enables the actuator to be activated by a connection being established between an electrical energy source and the actuator.

9. The arrangement according to claim 1, wherein the first path is disposed close to the second path so that a common-mode fault causes the first value and the second value to both increase or both decrease, such that the actuator is not activated by the circuit.

10. The arrangement according to claim 1, wherein the activation of the actuator causes the brake to be applied.

11. The arrangement according to claim 1, having a first evaluation unit for outputting the first signal and a second evaluation unit for outputting the second signal.

12. A vehicle comprising:
a brake, and
an arrangement for controlling the activation of an actuator of the brake, the arrangement comprising:
a first path for a first signal relating to an activation of the actuator,
a second path for a second signal relating to the activation of the actuator, and a circuit for:
enabling the actuator to be activated such that the actuator is activated if in response to identifying both (a) a particular increase in a parameter of the first signal and (b) a particular decrease in a parameter of the second signal, and
not enabling the actuator to be activated in response to each of (a) a decrease in both the first and second parameters, (b) an increase in both the first and second parameters, and (c) an unchanged status in at least one of the first and second parameters, wherein the first and second path are configured such that a particular common-mode fault occurring in both the first and second paths causes the first value of the first signal and the second value of the second signal to both increase or both decrease, such that the actuator is not activated by the circuit.

13. A method for controlling the activation of an actuator of a brake of a motor vehicle having a first path for a first signal relating to the activation of the actuator and a second path for a second signal relating to the activation of the actuator, the method comprising the steps of:
identifying both (a) a particular increase in a first parameter of the first signal and (b) a particular increase in a second parameter of the second signal,
automatically activating the actuator in response to identifying the particular increase in the first parameter and the particular decrease in the second parameter, and
not activating the actuator in response to each of (a) a decrease in both the first and second parameters, (b) an increase in both the first and second parameters, and (c) an unchanged status in at least one of the first and second parameters, wherein the first and second path are configured such that a particular common-mode fault occurring in both the first and second paths causes the first value of the first signal and the second value of the second signal to both increase or both decrease, such that the actuator is not activated by the circuit.

14. The method according to claim 13, wherein the particular increase of the first parameter of the first signal and the particular decrease of the second parameter of the second signal each define a respective voltage change.

15. The method according to claim 13, wherein the particular increase of the first parameter of the first signal and the particular decrease of the second parameter of the second signal each define a respective current change.

16. The method according to claim 13, wherein the particular increase of the first parameter of the first signal corresponds to a change from a first to a second value and the particular decrease of the second parameter of the second signal corresponds to a change from the second to the first value.

17. The method according to claim 13, wherein the actuator is enabled to be activated by a connection being established between an electrical energy source and the actuator.

18. The method according to claim 13, wherein the activation of the actuator causes the brake to be applied.

19. The method according to claim 13, further comprising the steps of outputting the first signal and the second signal.

* * * * *